United States Patent Office — 3,294,747 — Patented Dec. 27, 1966

3,294,747
METHOD FOR PRODUCING THERMOPLASTIC POLYHYDROXYETHER
John S. Fry, Somerset County, N.J., assignor to Union Carbide Corporation, a corporation of New York
No Drawing. Filed Apr. 2, 1962, Ser. No. 184,571
8 Claims. (Cl. 260—47)

This invention relates, in general, to containment for edible items, i.e. potables and comestibles. In particular, the invention relates to means for the containment of edible items comprising a new thermoplastic material. The invention further relates to a novel method for preparing this new thermoplastic material. In a particular aspect, the invention relates to flexible packaging for edible items.

Edible items in the course of handling from producers, and processors, through distributors and retailers to the consumer necessarily encounter a variety of containments including storage and shipping containers, piping of various kinds, and packagings. Materials available for containment of edible items range from metallic materials such as iron and copper piping and metal foil to cellulosic materials such as boxes and cellophane films and to glass. Each of these materials has advantages, conversely each has serious limitations. Recently new materials, thermoplastic polymers have been taking a larger share of the food containment market. Unbreakability, easy fabricability, attractiveness, good barrier properties, good organoleptic properties i.e. lack of characteristic imparted taste and low cost are some of the advantages offered by thermoplastic polymers as food containments. A further advantage of many thermoplastic polymers is their possible transparency.

Transparent packaging materials have the advantage of permitting consumer inspection of package contents and of utilizing the attractiveness of the packaged goods themselves to induce purchase. Widely used transparent packaging materials, namely cellophane and glass, can not offer the versatility of design and the durable toughness of thermoplastic polymers. Thermoplastic polymers, therefore, are the containment of choice for edible items.

A thermoplastic resin offering outstanding physical properties, especially clarity, toughness, and gas impermeability is that produced by the condensation reaction of a dihydric polynuclear phenol and an epihalohydrin in an alkaline medium.

Structurally similar thermoplastic resins to those referred to in the preceding sentence but physically inferior in lacking toughness and in having excessive gel have apparently been disclosed by Carpenter et al. in U.S.P. 2,602,075 issued July 1, 1952.

The resins produced by Carpenter are somewhat greater in molecular weight than and represent some advance over commercially available thermosetting brittle resins which can be produced by the reaction of dihydric polynuclear phenols, e.g., 2,2 - bis(4 - hydroxyphenyl) propane and epihalohydrins, e.g. epichlorohydrin and which can be represented by the formula

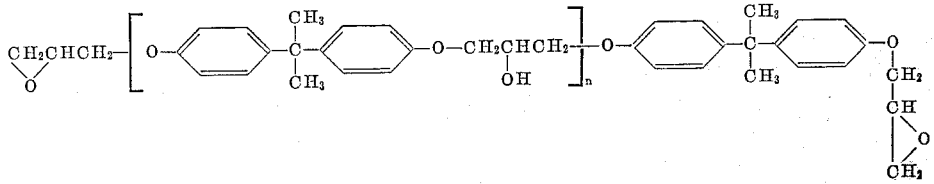

wherein $n$ is an integer having a value of 0 to about 20. These low molecular weight "epoxy" resins suffer the deficiency of being brittle and friable and of not possessing adequate toughness for use in typical plastics applications unless reacted with other materials and converted to a thermoset state and they are, therefore, of no utility in molding applications and in the formation of thin, self-sustaining film material.

The resins disclosed by Carpenter et al. are, as mentioned, somewhat higher in molecular weight than the epoxy resins, but because of their still low molecular weight are characterized by undesirable properties such as low extensibility, low reduced viscosity and lack of toughness as indicated by low impact strength. In addition, the resins disclosed by Carpenter et al. contain undesirable quantities of gel, which is an insoluble, infusible product. As a result film produced from these resins contain visible gel specks, commonly referred to as fish eyes, which mar the appearance of the film and make it unattractive for many applications, such as food wrapping.

Surprisingly, substantially linear, gel free thermoplastic polymers which have excellent mechanical properties and which find wide utility in the production of shaped articles, such as film material, pipe and the like can be prepared from dihydric polynuclear phenols and epihalohydrins by reacting approximately equimolar amounts of the dihydric polynuclear phenol and epihalohydrin together with an amount of an alkali metal hydroxide, generally in an aqueous medium at a temperature below about 50° C. until at least 60 mole percent of the epihalohydrin has been consumed, and then heating the reaction mixture (adjusted so that the molal concentration of alkali metal hydroxide is at least 0.1) at a temperature over 60° C. until the product polymer, termed a thermoplastic polyhydroxyether, has the desired reduced viscosity.

Not every thermoplastic polyhydroxyether, however, having the desired reduced viscosity is suitable for containment of edible items. This is because the increasing complexity of food processing, handling and distributing patterns has necessitated promulgation of governmental standards by the Food and Drug Administration (FDA), for, among other things, the materials coming in contact with edible items.

Basically, what is required by the regulations is that the containment material have negligible levels of chemicals extractable by foods in contact therewith.

There has thus been added to the list of essential attributes of thermoplastic materials to be used for the containment of edible items, in addition to the previously necessary properties of clarity, gloss, high tensile strength and good barrier properties, and easy fabricability into useful shapes, the further requirement that the material contain only negligible amounts of chemicals which can be removed by contact with the solvents present in food. Food solvent removable chemicals are herein termed "food solvent extractables."

It is an object, therefore, of the present invention to provide thermoplastic material useful for containment of edible items by virtue of having a substantially complete absence of food solvent extractables.

It is another object to provide containment for edible items which exhibits high gloss, high tensile strength, and good barrier properties and which is characterized by a substantially complete absence of food solvent extractables.

It is another object to provide packaging film for edible items which exhibits high gloss, high tensile strength, good clarity, good barrier properties and good organoleptic properties and which is characterized by a substantially complete absence of food solvent extractables.

It is still another object to provide a method for producing thermoplastic materials possessing the above attributes.

It is still another object to provide a method for producing these thermoplastic materials utilizing a novel product recovery solvent.

Containment for edible items fabricated of thermoplastic polyhydroxyether has now been discovered that is outstanding in its gloss, clarity, tensile strength and barrier properties and in its substantially complete absence of food solvent extractables. This thermoplastic polyhydroxyether is produced by reacting together substantially equimolar amounts of a dihydric polynuclear phenol and an epihalohydrin in an alkaline medium, dissolving the reaction product, a thermoplastic polyhydroxyether, in a caustic resistant, hydrophobic product recovery solvent, mixing the resulting solution with water, allowing the recovery solvent solution/water mixture to form two phases and separating the polyhydroxyether product-containing organic phase. Preferably the solvent is selected from the group consisting of certain mixtures of one or more liquid inert aromatic hydrocarbon solvents and one or more saturated aliphatic alcohols and ketones and mixtures thereof.

The signal feature of the method of this invention is the use of a caustic resistant, hydrophobic, i.e. nonwater miscible solvent for the polymer product as the recovery solvent. Preferred is the simultaneous utilization, in prescribed ratios, of a liquid inert aromatic hydrocarbon solvent and a saturated aliphatic alcohol or utilization of a ketone, or utilization of a mixture of these to dissolve the polymer after reaction and before mixing with water for the washing step. It has been discovered that this step enables separation of virtually all potential food solvent extractables from the polyhydroxyether in a simple mechanical manner e.g. decantation. The solvent system effectively isolates in one phase the thermoplastic polyhydroxyether, while virtually all potential food solvent extractables are borne in the easily separable alkaline water phase.

The solvent system used in the present method in one embodiment comprises both (a) an inert liquid aromatic hydrocarbon and (b) a saturated aliphatic alcohol and in a ratio of (a) to (b) of 4:1 to 1:1 inclusive, preferably 3:1 to 1:1 inclusive. The solvent system can contain other liquids, either solvents or not for the polyhydroxyether, provided the ratio of (a) and (b) remains in the range of 4:1 to 1:1 inclusive. Other liquids include reaction media, reaction diluents, reagent vehicles and similar conventionally employed organic and inorganic liquid materials such as, for example, water; halogenated aromatic hydrocarbons, such as monochlorobenzene cycloaliphatic and substituted cycloaliphatic hydrocarbons such as cyclohexane, n-propyl cyclohexane, and the like; alkoxy substituted aromatic hydrocarbons, such as anisole and the like; aliphatic hydrocarbons such as n-hexane, n-heptane and the like; halogenated aliphatic hydrocarbons, such as dichloromethane, 1,2-dichloroethane, and the like, ethers such as alkyl ethers e.g. diethyl ether and the like; aliphatic ketones, such as acetone, methyl ethyl ketone, diethyl ketone and the like; hydroxylated organic diluents such as ethylene glycol monomethyl ether, ethylene glycol monoethyl ether, ethylene glycol monobutyl ether, diethylene glycol monomethyl ether, ethylene glycol monoethyl ether, ethylene glycol monobutyl ether, and the like; as well as aromatic alcohols such as benzyl alcohol and the like.

The liquid inert aromatic hydrocarbon solvent which constitutes four-fifths and preferably three-fourths to one-half by weight inclusive of the solvent system in the instant embodiment of the present method is free of aliphatic unsaturation and can contain from 6 to 10 carbon atoms, preferably from 6 to 8 carbon atoms. This component of the solvent system thus can be benzene, or mono or polyalkyl substituted benzene e.g. toluene, ethyl benzene, xylene, and the like, or mixtures of two or more of the foregoing to achieve the correct weight amount of liquid inert aromatic hydrocarbon in the solvent system.

The saturated aliphatic alcohol which contributes from one-fifth, preferably one-fourth to one-half by weight inclusive of the solvent system of the present method is substantially water-immiscible and has the general formula $R^3OH$ wherein $R^3$ is an alkyl group, containing from 4 to 10 carbon atoms inclusive and preferably containing from 4 to 6 carbon atoms, inclusive. This component can thus be a butanol, e.g. n-butanol, sec-butanol, or isobutanol, a pentanol, e.g. pentanol-3 and hexanol e.g. cyclohexanol.

In a second embodiment of the method of this invention there is used as the product recovery solvent a ketone which is substantially immiscible with water and a solvent for the polymer product and which is free of aromatic unsaturation. Preferred among the useful ketones are those free of aliphatic and aromatic unsaturation and containing 4 or more up to 10 or above carbon atoms exclusive of the carbonyl carbon i.e. compounds of the formula

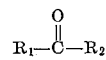

wherein $R_1$ and $R_2$ which can be the same or different are organic hydrocarbon radicals containing a total of 4 to 10 or more carbon atoms. Particularly preferred are ketones wherein each $R_1$ and $R_2$ are the same or different alkyl radical e.g. those wherein each alkyl group contains from 1 to 5 carbon atoms such as diethyl ketone methyl isopropyl ketone, methyl isobutyl ketone, ethyl amyl ketone, pentanone-2, pentanone-3 and the like; and ketones wherein $R_1$ and $R_2$ are joined in an aliphatic ring e.g. of from 4 to 6 carbon atoms, exclusive of the ketonic carbon such as cyclopentanone and cycloheptanone.

In a third embodiment of the method of this invention there is used as the product recovery solvent a mixture of (A) the aromatic hydrocarbon-alcohol mixture described above and (B) the ketone described above, suitably by substituting on an equal weight basis (A) for (B) or (B) for (A).

The thermoplastic polyhydroxyethers of the present invention are substantially linear, gel free thermoplastic condensation reaction products of a dihydric polynuclear phenol and an epihalohydrin and contain as the recurring unit a residue of a dihydric polynuclear phenol having the general formula —O—E—O— wherein E is the nucleus of the dihydric polynuclear phenol in which the hydroxyl groups are attached to different nuclei, and a group having the general formula:

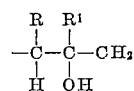

wherein R, and $R^1$ which can be the same or different are hydrogen or methyl, with the recurring units of the polyhydroxyether having the general formula:

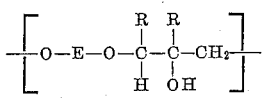

E, R and $R^1$ being as previously defined.

The ultra-low food solvent extractable content thermoplastic polyhydroxyethers of the present invention are, in general, prepared by the condensation reaction of dihydric polynuclear phenols and epihalohydrins in an alkaline medium, initially at low temperatures until at least 60 mole percent of the epihalohydrin has been consumed, and subsequently at higher temperatures e.g. reflux temperature.

In particular, thermoplastic polyhydroxyethers are prepared by admixing in a suitable reaction vessel a dihydric polynuclear phenol, from about 0.985 to about 1.015 moles of an epihalohydrin, preferably 1.0 mole, per mole of dihydric polynuclear phenol together with from about 0.5 to about 1.4 moles, preferably about 1.1 to 1.25 moles per mole of dihydric polynuclear phenol, of an alkali metal hydroxide such as sodium hydroxide, potassium hydroxide, lithium hydroxide and the like, added entirely initially or 5 to 50 percent added stepwise over the course of the reaction, generally in an aqueous medium at a temperature of about 10° C. to about 50° C., preferably about 20 to 40° C. until at least about 60 mole percent of the epihalohydrin has been consumed (conveniently determined by titrating an aliquot part of the mixture with 0.1 N HCl in order to determine the amount of unreacted alkali metal hydroxide, the amount of base consumed corresponding to the amount of unreacted epihalohydrin) adjusting, if necessary, the amount of alkali metal hydroxide in the reaction mixture so that the final concentration of alkali in the aqueous phase of the reacted mixture, i.e. at the completion of the reaction is between about 0.1 molal and 1.2 molal, and preferably from about 0.3 to about 0.6 molal, and heating the reaction mixture at a temperature of from about 60° C. to boiling or reflux or up to 125° C. and higher under pressure until the product thermoplastic polyhydroxyether has the desired reduced viscosity, generally above 0.35 and preferably above 0.5.

It is desirable to conduct the entire reaction between the dihydric polynuclear phenol and the epihalohydrin, while with the reactants in contact with an inert, organic diluent, preferably an hydroxylated organic diluent, which is a solvent for the starting materials and is nonreactive with respect to the final product. Using an organic diluent at the outset facilitates agitation of the reaction mixture throughout the process, and is practically essential in presently known agitating equipment during the latter stages of polymerization. The organic diluent used as a reaction medium depends in large measure upon the particular starting materials and the temperature at which the reaction is to be conducted. It is customery to use the organic diluent in amounts of at least about 50 percent by weight based on the weight of the dihydric polynuclear phenol. The upper limit with respect to the amount of organic diluent used will depend upon the rate at which it is desired to conduct the reaction. The more dilute the reaction mixture, of course, the slower the rate of reaction. Ordinarily, the organic diluent is used in amounts up to about 500 percent by weight based on the weight of the dihydric polynuclear phenol.

Suitable organic diluents include, among others, the aromatic hydrocarbons, such as benzene, xylene, and the like; the halogenated aromatic hydrocarbons, such as chlorobenzene and the like; cycloaliphatic hydrocarbons, such as cyclohexane, n-propyl cyclohexane, and the like; alkoxy substituted aromatic hydrocarbons, such as n-hexane, n-heptane, and the like; halogenated aliphatic hydrocarbons, such as dichloromethane, 1,2-dichloroethane, and the like; ethers, such as diethyl ether, and the like; aliphatic ketones, such as acetone, methyl ethyl ketone, diethyl ketone and the like.

Particularly desirable organic diluents are the hydroxylated organic diluents such as the aliphatic alcohols having the general formula $R^4OH$ wherein $R^4$ is an alkyl group, preferably containing from 1 to 10 carbon atoms inclusive. Specific compounds include among others methanol, ethanol, n-butanol, pentanol-3, n-hexanol and the like. Other hydroxylated organic diluents are ethylene glycol monomethyl ether, ethylene glycol monoethyl ether, ethylene glycol monobutyl ether, diethylene glycol monomethyl ether, diethylene glycol monobutyl ether, and the like as well as aromatic alcohols such as benzyl alcohol and the like.

Other particularly desirable organic diluents are ketones free of aliphatic and aromatic unsaturation and containing from 4 to 10 carbon atoms exclusive of the carbonyl-carbons. Specific compounds include among others diethyl ketone, methyl isopropyl ketone, pentanone-2, pentanone-3, methyl isobutyl ketone, ethyl amyl ketone, cycloheptanone and the like.

It is to be understood that mixtures of organic diluents can be used if so desired. The organic diluent can form part of the initial reaction mixture or can be added to the reaction mixture at convenient times during the course of the reaction or both procedures can be combined. A highly advantageous organic diluent for the reaction mass is one conforming to the product recovery solvent to be used, e.g., a mixture of a liquid inert aromatic hydrocarbon solvent and a saturated aliphatic alcohol in a weight ratio of from 4:1 to 1:1 inclusive, or in the alternative either the aromatic hydrocarbon or the saturated aliphatic alcohol, or the ketone, or a combination of these.

Once a polyhydroxyether is produced which has the desired reduced viscosity of, usually at least about 0.35 to about 1.2 or more (measured as a 0.2 gram sample in 100 milliliters of tetrahydrofuran) it is customary to insure that the polyhydroxyether is free of epoxy groups, i.e.,

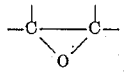

by adding to an organic solution of the polyhydroxyether, a small amount of a monofunctional compound which will destroy epoxy groups and heating the mixture for about 0.5 to 2 hours at reflux temperature. Illustrative of such compounds are monohydric phenols described as chain terminators elsewhere in this specification, as well as such monohydric phenols as p-hydroxybiphenyl, o-hydroxybiphenyl, o-cyclohexylphenol, p-cyclohexylphenol and the like; mineral acids such as hydrochloric acid, phosphoric acid and the like; monocarboxylic acids such as those having the formula $R^4COOH$ wherein $R^4$ is a saturated hydrocarbon group, preferably containing from 1 to 4 carbon atoms such as acetic acid, propionic acid, butyric acid and the like; aromatic acids such as benzoic acid and the like; secondary amines such as dimethylamine, diethylamine, di-n-propylamine, diethanolamine, and the like; mercaptans such as those having the general formula $R^5SH$ wherein $R^5$ is a saturated hydrocarbon group, preferably containing 1 to 4 carbon atoms inclusive such as ethyl mercaptan and the like.

As a rule heating an organic solution of the polyhydroxyether in contact with from about 0.1 mole to about 0.5 mole of a monofunctional compound, per mole of dihydric polynuclear phenol forming part of the initial reaction mixture, is sufficient to insure that all epoxy groups have been destroyed. More than about 0.5 mole of the monofunctional compound per mole of the dihydric polynuclear phenol can be used if so desired.

After reaction, the polyhydroxyether is recovered in a critical manner which is the method of this invention. First, there is added to the reaction mass, immediately if desired but preferably after the mass has cooled to below about 70° C. or conveniently to room temperature in one embodiment, sufficient amounts of either or both of a liquid inert aromatic hydrocarbon solvent and a saturated aliphatic alcohol depending on the reaction diluent employed, if any, to obtain a solution of the polyhydroxyether product in a mixture of the hydrocarbon solvent and the alcohol in a weight ratio of 4:1 to 1:1 inclusive; or, in a second embodiment a ketone, or alternatively a mixture of the product recovery solvents of the foregoing embodiments. As is apparent it is preferable to employ one or more of the components of the final product recovery solvent mixture as the reaction diluent, thereby minimizing the number of solvents present during the recovery procedure, and, as a result, simplifying handling and reducing costs.

Once a solution of the thermoplastic polyhydroxyether in the solvent mixture is obtained a sufficient amount of water is added to dissolve precipitated salts. The mixture is agitated by any means affording extensive contact of the mixture components and then allowed to settle. A two phase system develops. The lower phase is the alkaline water phase and contains dissolved salts, and a minor proportion of the undesired food solvent extractable materials. The lower alkaline phase is drawn off and discarded. To the upper, polymer bearing organic phase remaining there is added, importantly while the polymer is still alkaline, from 30 to 150 parts of water preferably about 70 parts per 100 parts of polymer phase, on a weight basis. This mixture is thoroughly agitated and then allowed to settle. The lower alkaline water phase is drawn off and discarded. This is the first wash. The water wash procedure is repeated. Analysis of the drawn off wash water by paper chromatographic analysis reveals the removal by the alkaline wash technique of the method of this invention of unreacted traces of dihydric polynuclear phenols, monophenols and lower molecular weight hydroxyl terminated intermediates, all of which are food solvent extractables.

It is to be noted that use of recovery solvents other than those described herein, particularly use of caustic sensitive and hydrophilic solvents, e.g., chloroform, tends to create an emulsion, only difficulty breakable, upon agitation with wash water.

In the wash steps from 4 to 8 percent by weight of the wash water is suitably some compatible organic material, e.g., an alcohol such as n-butanol.

After removal of food solvent extractables by alkaline water wash, the polymer solution is acidified by the addition of small amounts of acid dissolved in amounts of water like those used for the alkaline wash. Suitable acids include mineral acids e.g. hydrochloric and phosphoric, and organic acids e.g. acetic and oxalic. The acid wash serves to convert any alkali metal hydroxide which is still entrained in the polymer solution to the corresponding salt, which is readily removable by a water wash. The polymer solution is acid water washed until the solution has a pH of less than about 4.5. The thermoplastic polyhydroxyether is recovered by stripping off the solvent, as for example, by the use of a heated, two-roll mill or by coagulating the polyhydroxyether in a nonsolvent such as isopropanol or a mixture of isopropanol and water and recovering the polyhydroxyether as a filter cake, generally a white powdery solid.

The reaction is conducted, generally, under atmospheric pressure although, if desired, the reaction can be conducted under sub-atmospheric or in certain instances, preferably under super-atmospheric pressure. Also, the reaction can be conducted under the atmosphere of an inert gas such as nitrogen.

The method and products of the present invention are illustrated by the following examples. All parts and percentages are by weight unless otherwise stated. Reduced viscosity was in all examples determined at 25° C. using a 0.2 gram sample of the thermoplastic polyhydroxyether dissolved in 100 milliliters of tetrahydrofuran. Melt flow was determined at 220° C. and 44 pounds/square inch pressure according to ASTM 1238–57T unless otherwise stated.

*Example 1.—Preparation of low extractables polyhydroxyether in ethanol using mixture of toluene/n-butanol as reaction diluent and wash solvent*

The equipment used was a 350 gallon stainless steel autoclave having a bottom outlet and provided with an agitator, reflux condenser, and a temperature sensing device. There was placed in the autoclave:

| | Lbs. |
|---|---|
| 2,2-bis(4-hydroxyphenyl)propane | 400 |
| Ethanol | 370 |
| Aqueous sodium hydroxide (24.1%) | 320 |
| Epichlorohydrin | 163.95 |

The reaction mixture was held for 16 hours at 29–32° C. and then heated to reflux (80° C.) over the course of one hour. After one hour of holding at 80° C. there was added 80 lbs. of a 6:4 toluene-n-butanol mixture over the course of one hour. The total reaction time at 80° C. was two and one half hours. The polymerization was then terminated with 12 pounds of phenol dissolved in 120 pounds of the 6:4 toluene:n-butanol mixture. After holding an additional two hours at 80° C., the reaction mass was cooled to 60° C. and there was added with agitation 350 pounds of water and 1427 pounds of the 6:4 toluene:n-butanol solvent mixture. After cooling to 30° C., the reaction mixture/solvent mass was permitted to settle. The lower aqueous layer which developed was drained off. The upper organic layer was washed with water containing 4 percent n-butanol. The weight ratio of water to the organic layer was 1:5. After separation of the water layer, the organic layer was acidified with 6 pounds of 85 percent phosphoric acid dissolved in the 350 pounds of water containing 4 percent n-butanol. The polymer-solvent layer was then further washed four times with water in the same ratio as above (1:5). The polymer was isolated, by stripping off volatiles in a heated twin screw mill. The melt flow of the polymer was 2.1 dg./min. at 220° C. The polymer was extruded into film and tested for extractables in the following manner.

The extractables test consisted of immersing a film sample of the polyhydroxyether in a simulated "food solvent" and measuring by ultraviolet spectrophotometry the amount of aromatic ethers and phenols which has been extracted from the polyhydroxyether film sample by the solvent.

To carry out the test, 2″ x 2″ x 1 mil pieces of film of the polyhydroxyether were placed in a container with a volume of simulated food solvent sufficient to give a film surface to solvent volume ratio of 0.5 square inch per milliliter. The container was then closed and placed in an oven maintained at 57° C. The container was kept in the oven seven days, with agitation twice each day. After this period, the solution was decanted into a ten centimeter ultraviolet absorption cell. The absorbance of the cell was measured relative to a "blank," a cell containing only solvent which had received identical thermal treatment. The spectrum was scanned from 260 to 290 millimicrons. Absorbance was measured at the peak nearest 276 millimicrons. The level of extractables in the solution was calculated using the extinction coefficient of the 2,2-bis(4-hydroxyphenyl)propane, which was determined on the same instrument. The level of extractables as expressed in parts per million parts of the food solvent, on a weight to volume basis, were as follows:

| Food solvent: | Level of extractables (p.p.m.) |
|---|---|
| Water | 0.11 |
| 90/10 water/ethanol | 0.49 |
| Heptane | 0.08 |

To demonstrate that other methods not employing the product recovery solvents of the present invention do not provide low food solvent extractables content polyhydroxyether, there are now presented two experiments.

EXPERIMENT A

The first experiment is a duplication of Example 18 of the Carpenter et al. patent referred to above.

Into a two-liter, three-necked flask equipped with a sealed stirrer, thermometer, and reflux condenser there was placed:

|  | Gms. |
|---|---|
| 2,2-bis-(p-hydroxyphenyl)-propane (0.5 mole) | 114.0 |
| Epichlorohydrin (0.5 mole) | 46.3 |
| Ethanol | 120 |
| Sodium hydroxide | 22 |
| Water | 64.5 |

The mixture was heated under reflux, about 80° C. with stirring for 6 hours. The aqueous layer in the reaction mass was decanted. A clump of polymer was obtained. The clump was boiled with 100 ml. of water and the water was decanted. The polymer was neutralized with 10 ml. of 0.5 N HCl and held at 78° C. for 0.5 hour. The clump was washed four times with 160 milliliter portions of water and dissolved in chloroform to form a 20 percent solution. One mil film was cast from this solution and tested for extractables. Reduced viscosity of this polymer was 0.38. Results were:

| Food solvent: | Level of extractables (p.p.m.) |
|---|---|
| Water | 1.6 |
| 90/10 water/ethanol | 3.9 |

The second experiment was carried out as follows:

EXPERIMENT B

Into the equipment of Example 1 there was placed:

|  | Amount, lbs. |
|---|---|
| 2,2-bis-(4-hydroxyphenyl)-propane | 300 |
| Epichlorohydrin | 122.2 |
| Ethanol | 277 |
| Aqueous sodium hydroxide (24.1%) | 237 |

The reaction mixture was held for sixteen hours at 30° C. At the end of 16 hours the reaction mixture was heated to reflux (80° C.) over the course of one hour.

The reaction mixture was then held at 80° C. for two hours and 20 minutes. After the first one half hour of this heating, 139 pounds of monochlorobenzene was added over the course of the next hour.

At the end of this period, 12.36 pounds of phenol and 108.2 pounds of monochlorobenzene were added into the flask and refluxing was continued for another two hours (ca. 78° C.). After cooling to 40° C. there was added 590 lbs. of water and 1450 lbs. of chloroform and 29.1 lbs. of 85 percent $H_3PO_4$.

After agitation for two hours the reaction mass was allowed to settle. Two layers developed. The lower aqueous layer was drained off. The polymer-solvent mass was washed and decanted three times with water. The ratio of water to organics was 3:7. The polymer was isolated by stripping volatiles in a heated twin screw mill. A sample of the polymer had a melt flow of 2 decigrams/minute at 220° C. The polymer was extruded into film about 1 mil in thickness and tested for extractables. Results were as follows:

| Food solvent: | Level of extractables (p.p.m.) |
|---|---|
| Water | 1.2 |
| 90/10 water/ethanol | 4.0 |
| Heptane | 0.7 |

These extractable levels are unsatisfactory for food containment applications.

*Example 2.—Preparation of low extractables polyhydroxyether in ethanol/n-butanol mixture using mixture of toluene/n-butanol as reaction diluent and wash solvent*

The equipment used was a two liter three-necked flask provided with a sealed stirrer, thermometer and reflux condenser. There was placed in the flask

|  | G. |
|---|---|
| 2,2-bis(4-hydroxyphenyl)propane (0.5 mole) | 114.15 |
| Epichlorohydrin (99.1% pure) (0.5 mole) | 46.8 |
| Ethanol | 96.0 |
| n-Butanol | 10.0 |
| Sodium hydroxide (97.5% pure) | 22.6 |
| Water | 70.0 |

The above mixture was stirred at room temperature (25° C.) for 16 hours to accomplish the initial coupling reaction. The mixture was then heated at 80° C. for an hour. Thereupon, 60 milliliters of a 7:3 mixture of toluene:n-butanol was added to the flask. Heating of the mixture at 80° C. was continued another 2 hours. There was added to the flask an additional 50 milliliters of the 7:3 toluene:n-butanol mixture and 4.5 grams of phenol. The contents of the flask were continued heated at 80° C. (reflux) for 2 hours and then allowed to cool. Total reaction time at 80° C. was 5 hours. While cooling the reaction mixture was cut with an additional 200 milliliters of the 7:3 toluene:n-butanol mixture. One hundred milliliters of water was added to the flask and agitated with the contents to dissolve salts present in the reaction mixture. The flask contents were allowed to settle for 10 minutes, during which time a lower alkaline water phase formed. This lower phase was separated by decantation and discarded. The upper polymer solution-containing phase was washed successively with two 160 milliliter portions of water containing 4.5 percent butanol. The thus alkaline washed polymer solution was next acidified by stirring the solution with a mixture of one milliliter of 85 percent phosphoric acid and 100 milliliters of water (pH=2) for one hour. The upper polymer solution phase was separated by decantation and water washed with four successive 200 milliliter portions of water containing 4.5 percent butanol. The washed polymer was then coagulated in one liter of isopropanol, filtered and dried. There was obtained a polyhydroxyether of 2,2-bis (4-hydroxyphenyl)propane and epichlorohydrin having a reduced viscosity of 0.59.

*Example 3.—Preparation of low extractables polyhydroxyether in methanol using mixture of toluene/n-butanol as reaction diluent and wash solvent*

The equipment used was the same as in Example 2. There was placed in the flask

|  | G. |
|---|---|
| 2,2-bis(4-hydroxyphenyl)propane (0.5 mole) | 114.15 |
| Epichlorohydrin (99.1% pure) (0.5 mole) | 46.8 |
| Methanol | 105 |
| Sodium hydroxide (97.5% pure) | 23.6 |
| Water | 70.0 |

The mixture was stirred at room temperature for 16 hours to accomplish the initial coupling reaction. The mixture was then heated to 74° C. for an hour. Thereupon 60 milliliters of a 7:3 mixture of toluene:n-butanol was added to the flask. Heating of the mixture at 74° C. was now continued another 2 hours. There was added to the flask an additional 50 milliliters of the 7:3 toluene:n-butanol mixture and 4.5 grams of phenol. The contents of the flask were continued heated at 74° C. (reflux) for another 2 hours and then allowed to cool. Total reaction time at 74° C. was five hours. While cooling the reaction mixture was cut with 200 milliliters of the 7:3 toluene:n-butanol mixture. One hundred milliliters of water was added to the flask and agitated with the contents to dissolve salts present in the reaction mixture. The flask contents are allowed to settle for 10 minutes during which time a lower alkaline water phase formed. This lower phase was separated by decantation. The polymer was successively washed, coagulated, filtered and dried as in Example 2. There was obtained a polyhydroxyether of 2,2-bis(4-hydroxyphenyl)propane and epichlorohydrin having a reduced viscosity of 0.56.

*Example 4.—Preparation of low extractables polyhydroxyether in ethanol using toluene as reaction diluent and toluene/n-butanol as wash solvent*

The equipment used was the same as in Example 2. There was placed in the flask

| | G. |
|---|---|
| 2,2-bis(4-hydroxyphenyl)propane (0.5 mole) | 114.15 |
| Epichlorohydrin (99.1% pure) (0.5 mole) | 46.8 |
| Ethanol | 106 |
| Sodium hydroxide (97.5% pure) | 22.6 |
| Water | 70.0 |

The mixture was stirred at room temperature for 16 hours to accomplish the initial coupling reaction. The mixture was then heated at 80° C. for 4.5 hours. Over the course of this heating 95 milliliters of toluene was added gradually to the flask to maintain an agitatable mass. There was then added to the flask 4.5 grams of phenol. The contents of the flask were continued heated at 80° C. (reflux) for 1.5 hours and then allowed to cool. Total reaction time at 80° C. was 5.5 hours. While cooling the reaction mixture was cut with a mixture of 240 milliliters of toluene and 290 milliliters of n-butanol. The water addition and polymer work up and washing steps were as in Example 2. There was obtained a polyhydroxyether of 2,2-bis(4-hydroxyphenyl)propane and epichlorohydrin having a reduced viscosity of 0.68.

*Example 5.—Preparation of low extractable polyhydroxyether in ethanol using mixture of benzene/n-butanol as reaction diluent and wash solvent*

The equipment used was the same as in Example 2. There was placed in the flask

| | G. |
|---|---|
| 2,2-bis(4-hydroxyphenyl)propane (0.5 mole) | 114.15 |
| Epichlorohydrin (99.1% pure) | 46.8 |
| Ethanol | 106.3 |
| Sodium hydroxide (97.5% pure) | 22.6 |
| Water | 70.0 |

The above mixture was stirred at room temperature for 16 hours to accomplish the initial coupling reaction. The mixture was then heated at 80° C. for 3 hours. Over the course of this heating 150 milliliters of a 7:8 benzene:n-butanol mixture was added to the flask to maintain an agitatable mass. There was then added to the flask 4.5 grams of phenol. The contents of the flask were continued heated at 80° C. (reflux) for 2 hours and then allowed to cool. Total reaction time at 80° C. was 5 hours. While cooling, the reaction mixture was cut with 100 milliliters of benzene. One hundred milliliters of water was added to the flask and agitated with the contents to dissolve salts present in the reaction mixture, as in the preceding examples. The flask contents were allowed to settle for 10 minutes, during which time a lower brine phase formed. This lower phase was separated by decantation. The upper polymer solution-containing phase was washed with a single 160 milliliter portion of water containing 4.5% n-butanol. The washed polymer solution was acidified by stirring the solution with a mixture of one milliliter of 85% phosphoric acid and 100 milliliters of water (pH=2) for 1 hour. The upper polymer solution phase was again separated by decantation and water washed with 5 successive 200 milliliter portions of water containing 4.5% butanol. The washed polymer was then coagulated in one liter of isopropanol, filtered and dried. There was obtained a polyhydroxyether of 2,2-bis(hydroxyphenyl)propane and epichlorohydrin having a reduced viscosity of 0.56.

*Example 6.—Preparation of low extractables polyhydroxyether in ethanol using mixture of xylene/isobutanol as reaction diluent and wash solvent*

The equipment used was the same as in Example 2. There was placed in the flask

| | G. |
|---|---|
| 2,2-bis(4-hydroxyphenyl)propane (0.5 mole) | 114.15 |
| Epichlorohydrin (99.1% pure) (0.5 mole) | 46.8 |
| Ethanol | 106.3 |
| Sodium hydroxide (97.5% pure) | 22.6 |
| Water | 70.0 |

The above mixture was stirred at room temperature for 16 hours to accomplish the initial coupling reaction. The mixture was then heated at 80° C. for 4 hours. Over the course of this heating 125 milliliters of a 6:4 mixture of xylene:isobutanol was added to the flask. There was added to the flask 4.5 grams of phenol. The contents of the flask were continued heated at 80° C. (reflux) for another 2 hours. Total reaction time at 80° C. was 6 hours. Upon cooling, the reaction mixture was cut with 210 milliliters of 6:4 xylene:isobutanol mixture. One hundred milliliters of water was added to the flask and agitated with the contents to dissolve salts present in the reaction mixture. The polymer was washed, coagulated, filtered and dried as in Example 2. There was obtained a polyhydroxyether of 2,2-bis(4-hydroxyphenyl)propane and epichlorohydrin having a reduced viscosity of 0.48.

*Example 7.—Preparation of low extractables polyhydroxyether in ethanol using short, high temperature coupling step*

The equipment used was the same as in Example 2. There was placed in the flask

| | G. |
|---|---|
| 2,2-bis(4-hydroxyphenyl)propane, (0.5 mole) | 114.15 |
| Epichlorohydrin (99.1% pure) (0.5 mole) | 46.5 |
| Ethanol | 106 |

Sodium hydroxide (97.5% pure), 22.6 grams, was dissolved in 70.0 grams of water to make seventy-six milliliters of caustic solution. One half of this solution, 38 milliliters, comprising 55% of the stoichiometric amount was gradually added to the reaction flask. The reaction mixture was heated to 30° C. for the first 2 hours after the caustic addition, and then heated to 40° C. for the next 6 hours. The balance of the caustic solution was then added. The reaction mixture was heated at 80° C. for 4 hours. Over the course of this heating 195 milliliters of a 5:4 mixture of toluene:n-butanol was added to the flask to maintain agitatable mass. There was now added to the flask 4.5 grams of phenol. The contents of the flask were heated at 80° C. (reflux) for 2 more hours and then allowed to cool. Total reaction time at 80° C. was 6 hours. Upon cooling to 30° C. the reaction mixture was cut with 200 milliliters of toluene. To dissolve salts present in the reaction mixture, one hundred mililiters of water was added to the flask and agitated with the contents. The flask contents were allowed to settle and a lower brine phase formed. This lower phase was separated by decantation. The upper polymer solution-containing phase was washed successively with two 160 milliliter portions of water containing 4.5% butanol. The washed polymer solution was acidified by stirring the solution with a mixture of 1.1 grams of 85% phosphoric acid in 160 milliliters of water. The upper polymer solution phase was again separated by decantation and water washed with four successive 200 milliliter portions of water containing 4.5% butanol. The washed polymer was then isolated by coagulation in isopropanol, filtered and dried overnight in a 60° C. vacuum oven. There was obtained a polyhydroxyether of 2,2-bis(4-hydroxyphenyl)propane and epichlorohydrin having a reduced viscosity of 0.69.

*Example 8.—Preparation of low extractables polyhydroxyether in ethanol with short, high temperature coupling various mixtures of toluene/n-butanol as reaction diluent and wash solvent*

The equipment used was the same as in Example 2. There was placed in the flask

|  | G. |
|---|---|
| 2,2-bis(4-hydroxyphenyl)propane (0.5 mole) | 114.5 |
| Epichlorohydrin (99.1% pure) (0.5 mole) | 46.5 |
| Ethanol | 106 |

A caustic solution was prepared by dissolving 22.6 grams of sodium hydroxide (97.5% pure) in 70.0 grams of water to make a soluiton having a volume of 76 milliliters. More than half of the caustic solution, 58 milliliters, comprising 86% of the stoichiometric amount was gradually added to the mixture in the reaction flask. The reaction mixture was heated to 30° C. for the first 2 hours after caustic addition and to 40° C. for the next 6 hours. The remaining 18 milliliters of the caustic solution was then added. The reaction mixture was heated at 80° C. for 3 hours. Over the course of this heating 155 milliliters of a 1:1 mixture of toluene:n-butanol was added gradually to lower the reaction mixture viscosity. Phenol, 4.5 grams, was then added and the reaction was held at 80° C. for another hour. The reaction mixture was then cooled to 30° C., and was cut with 160 milliliters of 7:3 toluene:n-butanol mixture. Water, 100 milliliters, was added to dissolve salts present. The flask contents were allowed to settle. The lower brine layer which developed was separated. The upper polymer solution-containing phase washed successively with two 160 milliliter portions of water containing 4.5% butanol. The washed polymer solution was acidified by stirring for an hour with a solution of 1.1 grams of phosphoric acid in 160 milliliters of water. The upper polymer solution phase was again separated by decantation and water washed with four successive 200 milliliter portions of water containing 4.5% butanol. The washed polymer was then isolated by coagulation in isopropanol, filtered and dried overnight in a vacuum oven at 60° C. There was obtained polyhydroxyether having a reduced viscosity of 0.54.

*Example 9*

The equipment used was the same as in Example 2. There was placed in the flask

|  | G. |
|---|---|
| 2,2-bis(4-hydroxyphenyl)propane (0.5 mole) | 114.15 |
| Epichlorohydrin (98.8% pure) | 46.7 |
| Ethanol | 96.0 |
| n-Butanol | 10.0 |

Sodium hydroxide (97.5% pure), 22.6 grams, was dissolved in 70.0 grams of water ot make seventy-six milliliters of caustic solution. Over half of this solution, 66 milliliters, comprising 95% of the stoichiometric amount was gradually added to the reaction flask. The reaction mixture was heated to 30° C. for the first 2 hours, after the caustic addition and then heated to 40° C. for the next 6 hours. The balance of the caustic solution was then added. The reaction mixture was heated at 80° C. for 3 hours. Over the course of this heating 115 milliliters of a 7:3 toluene:n-butanol mixture was added to the flask. There was now added to the flask 4.5 grams of phenol. The contents of the flask were heated at 80° C. (reflux) for 2 more hours and then allowed to cool. Total reaction time at 80° C. was 5 hours. Upon cooling to 30° C. the reaction mixture was cut with 250 milliliters of the 7:3 toluene:n-butanol mixture. One hundred milliliters of water was added to the flask and agitated with the contents to dissolve solvents present in the reaction mixture. The flask contents were allowed to settle and a lower brine phase formed. This lower phase was separated by decantation. The polymer was isolated by coagulation, filtered and dried as in Example 7. There was obtained a polyhydroxyether of 2,2-bis(4-hydroxyphenyl)propane and epichlorohydrin having a reduced viscosity of 0.51.

*Example 10*

The equipment used was the same as in Example 2. There was placed in the flask

|  | G. |
|---|---|
| 2,2-bis(4-hydroxyphenyl)propane (0.5 mole) | 114.15 |
| Epichlorohydrin (98.8% pure)(0.5 mole) | 46.7 |
| Ethanol | 96 |
| n-Butanol | 10 |

Sodium hydroxide (97.5% pure), 22.6 grams, was dissolved in 70.0 grams of water to make seventy-six milliliters of caustic solution. Slightly over half of this solution, 42 milliliters, comprising 60 percent of the stoichiometric amount was gradually added to the reaction flask. The reaction mixture was heated to 30° C. for the first 2 hours after the caustic addition and then heated to 40° C. for the next 5 hours. The balance of the caustic solution was then added and the reaction mixture maintained at 40° C. for an additional hour. The reaction mixture was then heated to 80° C. and maintained at this temperature for 4 hours, over the course of which 115 milliliters of a 7:3 toluene:n-butanol mixture was added to the flask. Total reaction time at 80° C. was 4 hours. Upon cooling to 30° C. the reaction mixture was cut with 250 milliliters of 7:3 toluene:n-butanol mixture. Washing, isolation and coagulation of the polymer was carried out as in Example 7. There was obtained a polyhydroxyether of 2,2-bis(4-hydroxyphenyl)propane and epichlorohydrin having a reduced viscosity of 0.55.

*Example 11.—Preparation of low extractables polyhydroxyether with medium coupling using toluene-butanol only for both coupling and polymerization steps*

The equipment used was the same as in Example 2. There was placed in the flask

|  | G. |
|---|---|
| 2,2-bis(4-hydroxyphenyl)propane (0.5 mole) | 114.15 |
| Epichlorohydrin (98.8% pure) | 46.7 |
| n-Butanol | 80 |

Sodium hydroxide (97.5% pure), 23.6 grams was dissolved in 89 grams of water. This caustic solution was added over the course of one hour to the above reaction mixture, maintained at 30° C. for another 2 hours and then heated to 40° C. for the next 6 hours. The reaction mixture was then heated to 88° C. for 4 hours. Over the course of the 4 hours, seventy-five milliliters of a 7:3 toluene:n-butanol mixture was added to the flask. After the 4 hours, there was added to the flask an additional 30 milliliters of the 7:3 toluene:n-butanol mixture and 4.5 grams of phenol. The contents of the flask were heated at 88° C. (reflux) for an hour and then allowed to cool. Total reaction time at 88° C. was 5 hours. Upon cooling to 60° C. the reaction mixture was cut with 250 milliliters of the 7:3 -toluene:n-butanol mixture. One hundred milliliters of water was added to the flask and agitated with the contents to dissolve salts present in the reaction mixture. The flask contents were allowed to settle and a lower brine phase formed. This lower phase was separated by decantation. The upper polymer solution containing phase was washed as in Example 7 and the polymer was isolated by coagulation, washed, filtered and dried as in Example 7. There was obtained a polyhydroxyether of 2,2-bis(4-hydroxyphenyl)propane and epichlorohydrin having a reduced viscosity of 0.59.

Example 12

The equipment used was the same as in Example 2. There was placed in the flask

|   | G. |
|---|---|
| 2,2-bis(4-hydroxyphenyl)propane (0.5 mole) | 114.15 |
| Epichlorohydrin (98.8% pure) (0.5 mole) | 46.7 |
| n-Butanol | 80 |

Example 13

Example 7 was duplicated but adding 115 percent of the stoichiometric amount of sodium hydroxide initially and continuing the coupling step for only 1–2 hours at 40° C. The second stage of the reaction is run under mild pressure (15–40 pounds/square in. gauge) at 95° to 125° C. for 1.5 hours.

Example 14.—Rapid coupling reaction

The equipment used was the same as in Example 2. There was placed in the flask

|   | G. |
|---|---|
| 2,2-bis(4-hydroxyphenyl)propane | 114.15 |
| Epichlorohydrin (98.9% pure) | 46.6 |
| Ethanol | 106 |

Sodium hydroxide, 23.6 g. (115 percent of the stoichiometric amount) was dissolved in 70.0 grams of water and the solution was added to the flask at 40° C., over a 45 minute period. The reaction mass was held at 40° C. for one hour to accomplish the coupling. The reaction mass temperature was then raised to 78° C. over 0.5 hour and then heated at 78° C. for four hours and there was added gradually 120 g. of a 7:3 toluene:n-butanol mixture. Phenol, 4.5 grams, was added then and the reaction mass was held for an additional hour at 78° C. The reaction mass was cooled to 30° C. while 200 g. of 7:3 toluene:n-butanol and 100 g. of water were added and agitated. After settling, the lower aqueous layer was decanted. Washing, isolation and coagulation was carried out as in Example 2. Sodium hydroxide (97.5% pure), 24.0 grams, (117 percent of stoichiometric), was dissolved in 100 grams of water. This caustic solution was gradually added to the reaction flask over the course of an hour while the reaction mixture was heated to 30° C. The reaction mixture was then held at 30–35° C. for an additional 2 hours and then heated to 40° C. for the next 6 hours. The reaction mixture was then heated to 88° C. over the course of an hour and held at this temperature for 4 hours. During the course of the 4 hours heating at 88° C. there was added to the reaction mixture 75 milliters of a 7:3 toluene:n-butanol mixture. After the 4 hour heating step an additional 30 milliliters of the 7:3 toluene:n-butanol mixture and 4.5 grams of phenol were added to the flask. The contents of the flask were maintained at 88° C. (reflux) for an hour and then allowed to cool. Total reaction time at 88° C. was 5 hours. Upon cooling to 50° C. the reaction mixture was cut with 250 milliliters of the 7:3 toluene:n-butanol mixture. One hundred milliliters of water was added to the flask and agitated with the contents to dissolve salts present in the reaction mixture. The flask contents were allowed to settle and a lower brine phase formed. This lower phase was separated by decantation. The upper polymer solution containing phase was washed as in Example 7. The polymer was isolated by coagulation, filtered and dried as in Example 7. There was obtained a polyhydroxyether of 2,2-bis(4-hydroxyphenyl)propane and epichlorohydrin having a reduced viscosity of 0.65. Reduced viscosity was 0.56.

Example 15.—Preparation of low extractable polyhydroxyether in sec.-butyl alcohol using toluene as reaction diluent and toluene/sec.-butyl alcohol as wash solvent The equipment used was the same as in Example 2. There was placed in the flask

|   | G. |
|---|---|
| 2,2-bis(4-hydroxyphenyl)propane (0.5 mole) | 114.15 |
| Epichlorohydrin (99.1% pure) (0.5 mole) | 46.5 |
| Secondary butyl alcohol | 195 |
| Sodium hydroxide (97.5% pure) (110% of stoichiometric) | 22.6 |
| Water | 70.0 |

The above mixture was heated at 30° C. for 3 hours and then to 40° C. for the next 6 hours. The reaction mixture was then heated to 77° C. and maintained at this temperature for 5 hours. After 2 hours at 77° C., 40 milliliters of toluene was added to the reaction mixture. After 5 hours at 77° C., 4.5 grams of phenol was added to the reaction mixture and the reaction mixture was held at 77° C. for an additional 2 hours and then was allowed to cool. Total reaction time at 77° C. was 7 hours. While cooling, the reaction mixture was cut with 200 milliliters of a 7:3 toluene:sec-butyl alcohol mixture. One hundred milliliters of water was added to the flask and agitated wtih the contents to dissolve salts present in the reaction mixture. The flask contents were allowed to settle and a lower brine phase formed. This lower phase was separated by decantation. The upper polymer solution containing phase was washed successively with two 160 milliliter portions of water containing 4.5% n-butanol. The washed polymer solution was acidified by stirring with a solution of one milliliter of 85% phosphoric acid in one hundred milliliters of water (pH=2) for one hour. The upper polymer solution phase was again separated by decantation and was water washed with four successive 200 milliliter portions of water containing 4.5 grams n-butanol. The washed polymer was then coagulated in one liter of isopropanol, filtered and dried as in Example 2. There was obtained a polyhydroxyether of 2,2-bis(4-hydroxyphenyl)-propane and epichlorohydrin having a reduced viscosity of 0.49.

Example 16

The equipment used was the same as in Example 2. There was placed in the flask

|   | G. |
|---|---|
| 2,2-bis(4-hydroxyphenyl)propane (0.5 mole) | 114.15 |
| Epichlorohydrin (98.8% pure) (0.5 mole) | 46.7 |
| Isobutyl alcohol | 100 |
| Sodium hydroxide (124% of stoichiometric) | 25.5 |
| Water | 93.5 |

The above mixture was stirred at room temperature for 6 hours to accomplish the intial coupling reaction. The mixture was then heated to 92° C. and maintained at this temperature for 4 hours. Over the course of the 4 hours there was gradually added to the reaction mixture 95 milliliters of a 6:4 toluene:isobutyl alcohol mixture. There was then added to the flask 4.5 grams of phenol. The reaction mixture was held at 92° C. for an additional 1.5 hours after this addition. Total reaction time at 92° C. was 5.5 hours. Upon cooling to about 30° C. the reaction mixture was cut 250 milliliters of the 6:4 toluene:isobutyl alcohol mixture. Seventy milliliters of water was added to the flask and agitated with the contents to dissolve salts present in the reaction mixture. The flask contents were allowed to settle for 10 minutes, during which time a lower brine phase formed. This lower phase was separated by decantation. The washing steps and the polymer isolation, coagulation, filtering and drying were carried out as in Example 2.

There was obtained a polyhydroxyether of 2,2-bis-(4-hydroyphenyl)propane and epichlorohydrin having a reduced viscosity of 0.58.

*Example 17.—Preparation of low extractables polyhydroxyether using mixture of toluene ethanol as reaction diluent and wash solvent*

The equipment used was the same as in Example 2. There was placed in the flask

| | G. |
|---|---|
| 2,2-bis(4-hydroxyphenyl)propane (1.5 mole) | 342.45 |
| Epichlorohydrin (99.1% pure) (1.5 mole) | 139.8 |
| Ethanol | 318 |
| Sodium hydroxide (97.5% pure) | 67.8 |

The above mixture was stirred at room temperature for 16 hours to accomplish the initial coupling reaction. The mixture was then heated to 78° C. (reflux) and held at this temperature for 6 hours. Over the course of the first 2 hours of the reflux period there was added to the reaction mixture 180 milliliters of toluene. After the 6 hours, 13.5 grams of phenol was added and the reaction mixture thereafter maintained at 78° C. for another 2 hours. Total reaction time at 78° C. was 8 hours. One hundred milliliters of water was added to the reaction mixture and the agitator stopped. The flask contents were allowed to settle for 10 minutes, during which time a lower brine phase formed. The two phases developed with the temperature at 65° C. The lower phase was separated. A portion of the organic layer weighing 375 grams was diluted with 70 milliliters of a 3:4 toluene: ethanol mixture and was then washed with 150 milliliters of water. Another lower brine layer was former and this was separated at 55° C. The organic layer was acidified by agitating with a solution of 2 milliliters of 85% phosphoric acid in 150 milliliters of water and 70 milliliters of ethanol. Another lower brine phase was formed and was separated again at 55° C. The upper polymer containing phase was then washed with two successive portions of a mixture containing 150 milliliters of water and 60 milliliters of ethanol. The polymer was coagulated in isopropanol, filtered and dried in a vacuum oven at 60° C. There was obtained a polyhydroxyether of 2,2-bis(4-hydroxyphenyl)propane and epichlorohydrin having a reduced viscosity of 0.58.

*Example 18.—Preparation of low extractables polyhydroxyether in ethanol using diethyl ketone as reaction diluent and wash solvent*

The equipment used was a two liter three-necked flask provided with a sealed stirrer, thermometer and reflux condenser. There was placed in the flask

| | G. |
|---|---|
| 2,2-bis(4-hydroxyphenyl)propane (0.5 mole) | 114.15 |
| Epichlorohydrin (99.1% pure) (0.5 mole) | 46.5 |
| Ethanol (methanol denatured) | 106.3 |
| Sodium hydroxide (97.5% pure) (110% of stoichiometric) | 22.6 |
| Water | 70.0 |

The above mixture was stirred at 30° for 2 hours and at 40° C. for 6 hours to accomplish the initial coupling reaction. The mixture was heated to 80° C. for 40 minutes. Heating of the mixture at 80° C. was continued for 4 hours over the course of which there was added to the flask 120 milliliters of diethyl ketone. Phenol was then added. The contents of the flask were continued heated at 80° C. (reflux) for 2 hours and then allowed to cool. Upon cooling to 30° C. the reaction mixture was agitated with an additional 400 milliliters of diethyl ketone and 100 milliliters of water. The flask contents were allowed to settle for 10 minutes, during which time a lower alkaline water phase formed. This lower phase was separated by decantation and discarded. The washed polymer solution was next acidified by stirred the solution with a mixture of 3 milliliters of 85 percent phosphoric acid and 160 milliliters of water for one hour. The upper polymer solution phase was separated by decantation and water washed with five sucessive 200 milliliter portions of water containing 4.5 percent butanol. The washed polymer was then coagulated in one liter of isopropanol, filtered and dried overnight in a vacuum oven. There was obtained a polyhydroxyether of 2,2-bis(4-hydroxyphenyl)propane and epichlorohydrin having a reduced viscosity of 0.55.

This polyhydroxyether is tested for food solvent extractables content as in Example 1 and found to have less than one part per million extractables in water, heptane or aqueous ethanol.

*Example 19.—Preparation of low extractables polyhydroxyether in ethanol using methyl isopropyl ketone as reaction diluent and wash solvent*

The equipment used was the same as in Example 2. There was placed in the flask

| | G. |
|---|---|
| 2,2-bis(4-hydroxyphenyl)propane (0.5 mole) | 114.15 |
| Epichlorohydrin (99.1% pure) (0.5 mole) | 46.5 |
| Ethanol | 106.3 |
| Sodium hydroxide (97.5% pure) | 22.6 |
| Water | 70.0 |

The mixture was stirred at 35° C. for 2 hours, at 40° C. for 4 hours, to accomplish the initial coupling reaction. The mixture was heated to 80° C. for 40 minutes. Heating of the mixture at 80° C. was continued for 4 hours over the course of which there was added to the flask 175 milliliters of methyl isopropyl ketone. Phenol, 4.5 grams, was added, then. Upon cooling, the reaction mixture was cut with 200 milliliters of methyl isopropyl ketone. One hundred milliliters of water was added to the flask and agitated with the contents to dissolve salts present in the reaction mixture. The flask contents were allowed to settle for 10 minutes during which time a lower alkaline water phase formed. This lower phase was separated by decantation. The polymer was successively washed, coagulated, filtered and dried as in Example 18 except that 6 g. of oxalic acid in 100 milliliters of water was used in the acidification step. There was obtained a polyhydroxyether of 2,2-bis (4-hydroxyphenyl)propane and epichlorohydrin having a reduced viscosity of 0.57.

Illustrative of dihydric polynuclear phenols which can be treated with epihalohydrins to produce the thermoplastic polyhydroxyethers in the present invention are the dihydric polynuclear phenols having the general formula:

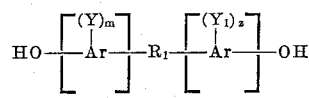

wherein: Ar is an aromatic divalent hydrocarbon radical such as naphthylene and phenylene with phenylene being preferred for the thermoplastic polyhydroxyethers of this invention; $Y$ and $Y_1$, which can be the same or different are alkyl radicals such as methyl, n-propyl, n-butyl, n-hexyl, n-octyl and the like, preferably alkyl radicals having a maximum of 4 carbon atoms; or halogen atoms, i.e., chlorine, bromine, iodine, or fluorine; or alkoxy radicals such as methoxy, methoxymethyl, ethoxy, ethoxyethyl, n-butyoxy, amyloxy and the like, preferably an alkoxy radical having a maximum of 4 carbon atoms. It is to be understood that whenever there are substituents exclusive of the hydroxyl groups on either or both of the aromatic divalent hydrocarbon groups, these substituents can be the same or different; $m$ and $z$ are integers having a value of from 0 to a maximum value corresponding to the number of hydrogen atoms on the aromatic ring (Ar) which can be replaced by substituents and can have the same or different values; and $R_1$ is a divalent radical, for example

or —O—, or —S—, or —SO—, or —SO$_2$—, or —S—S—, or a divalent hydrocarbon radical as for example an alkylene radical such as methylene, ethylene, trimethylene, tetramethylene, pentamethylene, hexamethylene, 2-ethyl hexamethylene, octamethylene, nonamethylene, decamethylene, and the like; an alkylidene radical such as ethylidene, propylidene, isopropylidene, isobutylidene, amylidene, isoamylidene, 1-phenyl ethylidene and the like, or a cycloaliphatic radical, such as 1,4-cyclohexylene, 1,3-cyclohexylene, cyclohexylidene, and the like, or halogenated alkylidene, alkylene, or cycloaliphatic radicals, alkoxy and aryloxy substituted alkylidene, alkylene or cycloaliphatic radicals, such as methoxy methylene, ethoxy methylene, ethoxy ethylene, 2-ethoxy trimethylene, 3-ethoxy, 2-phenoxy trimethylene, 1,3-(2-phenoxy cyclohexane), and the like, aralkylene radicals, such as phenyl ethylene, 2-phenyl trimethylene, 1-phenyl pentamethylene, 2-phenyl decamethylene, and the like, aromatic radicals, such as phenylene, naphthylene, and the like, halogenated aromatic radicals, such as 1,4-(2-chlorophenylene), 1,4-(2-bromophenylene), 1,4-(2-fluorophenylene), and the like; alkoxy and aryloxy substituted aromatic radicals, such as 1,4-(2-n-propoxyphenylene), 1,4-(2-phenoxyphenylene), and the like, alkyl substituted aromatic radicals, such as 1,4-(2-methylphenylene), 1,4-(2-ethylphenylene), 1,4-(2-n-propylphenylene), 1,4-(2-n-butylphenylene), 1,4-(2-n-dodecylphenylene) and the like; or $R_1$ can be a ring which is fused to one of the Ar groups as is the case, for example, in the compound having the formula:

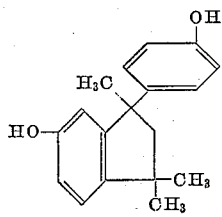

or $R_1$ can be polyalkoxy radical such as polyethoxy, polypropoxy, polythioethoxy, polybutoxy, polyphenylethoxy; or $R_1$ can be a radical containing a silicon atom as, for example polydimethylsiloxy, polydiphenylsiloxy, polymethylphenylsiloxy and the like; or $R_1$ can be two or more alkylene or alkylidene radicals separated by an aromatic ring, a tertiary amino group, an ether linkage, a carbonyl group or separated by a linkage containing sulfur such as sulfur, sulfoxide and the like.

Particularly preferred are dihydric polynuclear phenols having the general formula:

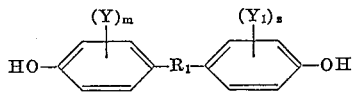

wherein Y, $Y_1$, are as previously defined, $m$ and $z$ have values of from 0 to 4 inclusive and $R_1$ is an alkylene or alkylidene group, preferably having from 1 to 3 carbon atoms inclusive or $R_1$ is a saturated group such as is obtained from compounds such as vinylcyclohexene and dipentene or its isomers by reaction with two moles of phenol per mole of the compound.

Thermoplastic polyhydroxyethers produced using the dihydric polynuclear phenols described in the preceding paragraph have extremely good mechanical properties. In addition, polyhydroxyethers produced using a dihydric polynuclear phenol wherein $R_1$ is the saturated group from vinylcyclohexene or dipentene or its isomers have heat distortion temperatures which are relatively high.

Examples of other specific dihydric phenols include among others:

This bis-(hydroxyphenyl)-alkanes such as 2,2-bis-(4-hydroxyphenyl)-propane,
2,4'-dihydroxy diphenylmethane,
bis-(2-hydroxyphenyl)-methane,
bis-(4-hydroxyphenyl)-methane,
bis-(4-hydroxy-2,6-dimethyl-3-methoxyphenyl)-methane,
1,1-bis-(4-hydroxyphenyl)-ethane,
1,2-bis-(4-hydroxyphenyl)-ethane,
1,1-bis-(4-hydroxy-2-chlorophenyl)-ethane,
1,1-bis-(3-dimethyl-4-hydroxyphenyl)-ethane,
1,3-bis-(3-methyl-4-hydroxyphenyl)-propane,
2,2-bis-(3-phenyl-4-hydroxyphenyl)-propane,
2,2-bis-(3-isopropyl-4-hydroxyphenyl)-propane,
2,2-bis-(2-isopropyl-4-hydroxyphenyl)-propane,
2,2-bis-(4-hydroxynaphthyl)-propane,
2,2-bis-(4-hydroxyphenyl)-pentane,
3,3-bis-(4-hydroxyphenyl)-pentane,
2,2-bis-(4-hydroxyphenyl)-heptane,
bis-(4-hydroxyphenyl)-phenylmethane,
bis-(4-hydroxyphenyl)-cyclohexylmethane,
1,2-bis-(4-hydroxyphenyl)-1-bis-(phenyl)-propane,
2,2-bis-(4-hydroxyphenyl)-1-phenylpropane and the like;

Di(hydroxyphenyl)sulfones such as bis-(4-hydroxyphenyl)-sulfone,
2,4'-dihydroxydiphenyl sulfone,
5'-chloro-2,4'-dihydroxydiphenyl sulfone,
5'-chloro-4,4'-dihydroxydiphenyl sulfone,
3'-chloro-4,4'-dihydroxydiphenyl sulfone,
3'-chloro-4,4'-dihydroxydiphenyl sulfone and the like;

Di(hydroxyphenyl) ethers such as bis-(4-hydroxyphenyl)-ether,
the 4,3'-, 4,2'-, 2,2'-, 2,3'-, dihydroxy-diphenyl ethers,
4,4'-dihydroxy-2,6-dimethyldiphenyl ether,
bis-(4-hydroxy-3-isobutylphenyl)-ether,
bis-(4-hydroxy-3-isopropylphenyl)-ether,
bis-(4-hydroxy-3-chlorophenyl)-ether,
bis-(4-hydroxy-3-fluorophenyl)-ether,
bis-(4-hydroxy-3-bromophenyl)-ether,
bis-(4-hydroxynaphthyl)-ether,
bis-(4-hydroxy-3-chloronaphthyl)-ether,
bis-(2-hydroxydiphenyl)-ether,
4,4'-dihydroxy-2,6-dimethoxy-diphenyl ether,
4,4'-dihydroxy-2,5-diethoxydiphenyl ether, and the like.

Also suitable are the bisphenol reaction products of 4-vinylcyclohexene and phenols,
1-(4-hydroxyphenyl)-1-[(4-hydroxyphenyl)-cyclohexyl] ethane,
1,3,3-trimethyl-1-(4-hydroxyphenyl)-6-hydroxyindane,
2,4-bis-(4-hydroxyphenyl)-4-methylpentane, the bis-phenol reaction products of dipentene or its isomers and phenols and the like.

Mixtures of dihydric polynuclear phenols can also be employed and wherever the term "dihydric polynuclear phenol" is used herein, mixtures of these compounds are intended to be included.

The dihydric polynuclear phenols which are used are substantially free of higher functional phenolic compounds, that is, phenols containing three or more phenolic hydroxy groups, such as trihydric phenols or trisphenols. In general, the dihydric polynuclear phenols used should contain less than about 1.5 mole percent and preferably less than about 0.5 mol percent, based on the moles of dihydric polynuclear phenol, of such higher functional phenols.

The concentration of the higher functional phenolic compounds in the dihydric polynuclear phenols can be readily measured by conventional chromatographic techniques such as described by W. M. Anderson, G. B. Carter and A. J. Landua in Analytical Chemistry 31, 1214

(1959) and if necessary, the dihydric polynuclear phenol can be purified by recrystallization from a suitable solvent such as toluene.

More than about 1.5 mole percent of a higher functional phenolic compound can be tolerated in the dihydric polynuclear phenols provided that an equivalent amount of a monohydric phenol is added in order to offset the increased functionality of the resultant system.

If desired, monohydric phenols can be added to the reaction mixture containing the dihydric polynuclear phenol and the epihalohydrin at the start of the reaction or at any other convenient time during the course of the reaction. The monohydric phenols serve to regulate the molecular weight of the polyhydroxyether by acting as a chain terminator. When used as chain terminator, the monohydric phenols are used in amounts of from about 0.01 mole to about 0.05 mole, preferably about 0.01 mole to about 0.02 mole per mole of the dihydric polynuclear phenol. This amount is in addition to the amount of monohydric phenol used for purposes of offsetting the presence of higher functional phenolic compounds as explained in the preceding paragraph. Illustrative of suitable monohydric phenols are the following: phenol, alkylated monohydric phenols such as m-cresol, ethyl phenol, p-tertiary butylphenol and the like; alkoxy monohydric phenols such as m-methoxyphenol, m-ethoxyphenol and the like; halogenated monohydric phenols such as m-chlorophenol, m-bromophenol and the like, and p-phenylphenol and the like.

Among suitable epihalohydrins and mixtures thereof which can be reacted with dihydric polynuclear phenols to produce the thermoplastic polyhydroxyethers are those having the general formula:

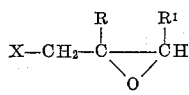

wherein R and R¹ can be the same or different are hydrogen or methyl and X is a halogen atom, i.e., chlorine, bromine, and the like. Specific epihalohydrins are epichlorohydrin, epibromohydrin, 1,2-epoxy-1-methyl-3-chloropropane and 1,2-epoxy-2-methyl-3-chloropropane.

*Example 20.—Low extractables polyhydroxyether prepared from epichlorohydrin and bisphenol of vinyl cyclohexene*

The equipment of Example 2 was used. There was charged to the flask

|  | G. |
|---|---|
| Bisphenol of vinylcyclohexene (reaction product of phenol and vinyl cyclohexane) (0.5 mole) | 148.2 |
| Epichlorohydrin (99.1% pure) (0.5 mole) | 46.8 |
| Ethanol | 176 |
| Sodium hydroxide (97.5% pure) (110% of the stoichiometric amount) | 22.7 |
| Water | 70.5 |

The reaction mixture was stirred at 25° C. for 16 hours and then agitated at 78° C. for four hours during which time there was added 250 milliliters of a 7:3 toluene:n-butanol mixture. Phenol, 4.5 grams, was added and the mixture heated at 78° C. for an hour. The reaction mass was cooled to 30° C. and 300 milliliters of the 7:3 toluene:n-butanol mixture was added along with 100 milliliters of water. After agitation and settling, the upper phase which developed was separated by decantation and washed with 200 milliliters of water and the wash water decanted. The polymer was neutralized by agitation with a solution of 2 milliliters of 85 percent $H_3PO_4$ in 160 milliliters of water for an hour. The polymer mass was washed four times with 200 milliliter portions of water and recovered by stripping on a hot (165° C.) two roll mill. The polymer was dissolved in chloroform to make a 20 percent solution and a film was cast therefrom. Reduced viscosity of the polymer was 0.58.

EXPERIMENT C

Example 20 was duplicated except that over the course of the four hour reaction there was added, instead of the toluene:n-butanol mixture 170 milliliters of chlorobenzene, and in washing 300 milliliters of chloroform was added in place of alcohol/aromatic mixture. Acidification was by agitating with 8 milliliters of 85 percent $H_3PO_4$. Recovery and film preparation were identical to Example 20. Reduced viscosity was 0.56.

The films obtained in Example 20 and Experiment C were tested as in Example 1. Results were

| Solvent | Food Solvent Extractables (p.p.m.) | |
|---|---|---|
|  | Example 20 | Experiment C |
| Water | 3.1 | 7.1 |
| Ethanol/Water 10/90 | 3.8 | 9.3 |
| Heptane | 3.4 | 7.5 |

The surprising reduction in food solvent extractables obtained by the present method is readily apparent.

*Example 21.—Low extractables polyhydroxyether prepared from epichlorohydrin and bisphenol of acetophenone*

The equipment of Example 2 was used. There was charged to the flask

|  | G. |
|---|---|
| Bisphenol of acetophenone (0.25 mole) | 72.6 |
| 2,2-bis(4-hydroxyphenyl)propane (0.25 mole) | 57.1 |
| Epichlorohydrin (99.1% pure) (0.5 mole) | 46.7 |
| Ethanol | 124 |
| Sodium hydroxide (97.5% pure) (110% of the stoichiometric amount) | 22.6 |
| Water | 70.0 |

The reaction mixture was stirred at 25° C. for 16 hours and then agitated at 78° C. for four hours during which time there was added 125 milliliters of a 7:3 toluene:n-butanol mixture was added along with 100 milliliters mixture heated at 78° C. for an hour. The reaction mass was cooled to 30° C. and 300 milliliters of the 7:3 toluene:n-butanol mixture was added along wgith 100 milliliters of water. After agitation and settling, the upper phase which developed was separated by decantation and washed with 200 milliliters of water and the wash water decanted. The polymer was neutralized by agitation with a solution of 2 milliliters of 85 percent $H_3PO_4$ in 160 milliliters of water for an hour. The polymer mass was washed four times with 200 milliliter portions of water and recovered by stripping on a hot (165° C.) two roll mill. The polymer was dissolved in chloroform to make a 20 percent solution and a film was cast therefrom. Reduced viscosity of the polymer was 0.53.

EXPERIMENT D

Example 21 was duplicated except that over the course of the four hour reaction there was added, instead of the toluene:n-butanol mixture 75 milliliters of chlorobenzene, and in washing 300 milliliters of chloroform was added in place of alcohol/aromatic mixture. Acidification was by agitating with 8 milliliters of 85 percent $H_3PO_4$. Recovery and film preparation were identical to Example 21. Reduced viscosity was 0.51.

The films obtained in Example 21 and Experiment D were tested as in Example 1. Results were

| Solvent | Food Solvent Extractables (p.p.m.) | |
|---|---|---|
| | Example 21 | Experiment D |
| Water | 0.28 | 0.89 |
| Ethanol/Water 10/90 | 0.52 | 0.92 |
| Heptane | 0.32 | 0.64 |

The surprising reduction in food solvent extractables obtained by the present method is readily apparent.

*Example 22*

Example 20 is duplicated but substituting 0.5 mole of 2,2-bis(3,5-dichloro-4-hydroxyphenyl)propane for the bisphenol of vinyl cyclohexene. A low extractables content polyhydroxyether is obtained.

*Example 23*

Example 20 is duplicated but substituting 0.5 mole of dihydroxydiphenyl sulfone for the bisphenol of vinyl cyclohexene. A low extractables content polyhydroxyether is obtained.

*Example 24*

Example 20 is duplicated but substituting 0.5 mole of 1,3,3-trimethyl-1-(4-hydroxyphenyl)-6-hydroxyindane for the bisphenol of vinyl cyclohexene. A low extractables content polyhydroxyether is obtained.

*Example 25*

Example 20 is duplicated but substituting 0.5 mole of 2,4-bis-(4-hydroxyphenyl)-4-(methylpentane) for the bisphenol of vinyl cyclohexene and 0.5 mole of 1,2-epoxy-1-methyl-3-chloropropane for the epichlorohydrin. A low extractables content polyhydroxyether is obtained.

*Example 26*

Example 20 is duplicated but substituting 0.5 mole of the bisphenol of dipentene or its isomers (reaction product of phenol and dipentene or its isomers, e.g. α-pinene, limonene, et cetera).

As is evident from the foregoing description the products of the present invention, low food solvent extractable polyhydroxyethers, are highly useful as containment for edible items, including containments such as piping, baskets, cups, bottles, film packaging. Moreover, the polyhydroxyethers herein lend themselves to combination with other materials, e.g. through high temperature bonding to substrates such as steel, metal foil and glass for food containments of great strength and minimal extractables content.

What is claimed is:

1. Method for producing thermoplastic polyhydroxyether having a substantially complete absence of food solvent extractables including the steps of:
   (a) reacting together a dihydric polynuclear phenol and from about 0.985 to about 1.015 moles of an epihalohydrin per mole of dihydric polynuclear phenol together with from about 0.5 to about 1.4 moles per mole of dihydric polynuclear phenol of an alkali metal hydroxide until a thermoplastic polyhydroxyether having a reduced viscosity measured at 25° C. as a 0.2 gram sample in 100 milliliters of tetrahydrofuran of at least above 0.5 is obtained,
   (b) adding to the reaction mass, while the thermoplastic polyhydroxyether is alkaline, a caustic resistant, hydrophobic product recovery solvent for the reaction product thermoplastic polyhydroxyether, said solvent being selected from the group consisting of a mixture of an aromatic hydrocarbon having 6 to 10 carbon atoms and a saturated aliphatic alcohol having 4 to 10 carbon atoms in a weight ratio of 4:1 to 1:1, and an aliphatic ketone containing 4 to 10 carbon atoms exclusive of the carbonyl carbon,
   (c) dissolving the thermoplastic polyhydroxyether in the product recovery solvent,
   (d) heating the resultant thermoplastic polyhydroxyether solution with from about 0.1 to 0.5 mole of a monofunctional compound capable of destroying epoxy groups per mole of thermoplastic polyhydroxyether at reflux temperature until no free epoxy groups remain in the thermoplastic polyhydroxyether,
   (e) mixing the resulting solution with water,
   (f) allowing the solution/water mixture to form two phases, one phase containing the thermoplastic polyhydroxyether, the other phase containing virtually all food solvent extractables,
   (g) acidifying the thermoplastic polyhydroxyether phase with an aqueous acid wash to a pH of less than about 4.5,
   (h) washing until all of the food solvent extractables are removed from the polyhydroxyether phase, and
   (i) separating the thermoplastic polyhydroxyether phase.

2. Method for producing thermoplastic polyhydroxyether having a substantially complete absence of food solvent extractables including the steps of:
   (a) reacting together a dihydric polynuclear phenol and from 0.985 to about 1.015 moles of an epihalohydrin per mole of dihydric polynuclear phenol together with from 1.1 to about 1.25 moles per mole of dihydric polynuclear phenol of an alkali metal hydroxide at a temperature between about 20° C. and about 40° C. until at least about 60 mole percent of the epihalohydrin has been consumed, heating the reaction mixture in contact with an inert organic diluent at a temperature between about 60° C. and reflux temperature for the mixture until a thermoplastic polyhydroxyether having a reduced viscosity measured at 25° C. as a 0.2 gram sample in 100 milliliters of tetrahydrofuran above about 0.5 is obtained,
   (b) adding to the reaction mass, while the thermoplastic polyhydroxyether is alkaline, a caustic resistant, hydrophobic product recovery solvent for the reaction product thermoplastic polyhydroxyether, said solvent being selected from the group consisting of a mixture of an aromatic hydrocarbon having 6 to 10 carbon atoms and a saturated aliphatic alcohol having 4 to 10 carbon atoms in a weight ratio of 4:1 to 1:1, and an aliphatic ketone containing 4 to 10 carbon atoms exclusive of the carbonyl carbon,
   (c) dissolving the thermoplastic polyhydroxyether in said solvent mixture,
   (d) heating the resultant thermoplastic polyhydroxyether solution with from about 0.1 to 0.5 mole of a monofunctional compound capable of destroying epoxy groups at reflux temperature until no free epoxy groups remain in the thermoplastic polyhydroxyether,
   (e) mixing the resulting solution with water,
   (f) allowing the solution/water mixture to form two phases, one phase containing the thermoplastic polyhydroxyether, the other phase containing virtually all food solvent extractables,
   (g) acidifying the thermoplastic polyhydroxyether phase, with an aqueous acid wash to a pH of less than about 4.5,
   (h) washing until all of the food solvent extractables are removed from the polyhydroxyether phase, and
   (i) separating the thermoplastic polyhydroxyether phase.

3. Method claimed in claim 2 wherein the solvent mixture aromatic hydrocarbon is toluene and the solvent mixture aliphatic alcohol is butanol in a weight ratio of from 3:1 to 1:1.

4. Method claimed in claim 2 wherein the alkali metal hydroxide is sodium hydroxide and the epihalohydrin is epichlorohydrin.

5. Method claimed in claim 2 wherein the monofunctional compound capable of destroying epoxy groups is a phenol.

6. Method claimed in claim 2 wherein the inert organic diluent is an hydroxylated diluent.

7. Method claimed in claim 2 wherein the dihydric polynuclear phenol is 2,2-bis(4-hydroxyphenyl) propane.

8. Thermoplastic polyhydroxyether produced by the method of claim 1 having fewer than one part by weight per million of extractables in a food extractable solvent.

References Cited by the Examiner
UNITED STATES PATENTS

| | | | |
|---|---|---|---|
| 2,767,157 | 10/1956 | Masters | 260—47 |
| 2,824,855 | 2/1958 | Freeman et al. | 260—47 |
| 2,840,541 | 6/1958 | Pezzaglia | 260—47 |
| 2,848,435 | 8/1958 | Griffin et al. | 260—47 |
| 2,870,101 | 1/1959 | Stewart | 260—47 |

WILLIAM H. SHORT, *Primary Examiner.*

LEON J. BERCOVITZ, *Examiner.*

T. D. KERWIN, *Assistant Examiner.*